US012509816B2

(12) United States Patent
Opher

(10) Patent No.: US 12,509,816 B2
(45) Date of Patent: Dec. 30, 2025

(54) FASTENER

(71) Applicants: WHIMPOSSIBLE LTD, Monmouth (GB); Eyal Opher, Monmouth (GB)

(72) Inventor: Eyal Opher, Monmouth (GB)

(73) Assignees: WHIMPOSSIBLE LTD., Monmouth (GB); Eyal Opher, Monmouth (GB)

( * ) Notice: Subject to any disclaimer, the term of this patent is extended or adjusted under 35 U.S.C. 154(b) by 0 days.

(21) Appl. No.: 18/719,844

(22) PCT Filed: Dec. 19, 2022

(86) PCT No.: PCT/GB2022/053289
§ 371 (c)(1),
(2) Date: Jun. 14, 2024

(87) PCT Pub. No.: WO2023/135404
PCT Pub. Date: Jul. 20, 2023

(65) Prior Publication Data
US 2025/0051999 A1 Feb. 13, 2025

(30) Foreign Application Priority Data
Jan. 16, 2022 (GB) .................................. 2200498

(51) Int. Cl.
*D06F 95/00* (2006.01)
(52) U.S. Cl.
CPC ................. *D06F 95/008* (2013.01)
(58) Field of Classification Search
CPC ..... D06F 95/008; D06F 55/02; A41B 11/002; A44B 17/0041; A44B 17/0047; A44B 17/0052; F16B 2/10; F16B 2/245
See application file for complete search history.

(56) References Cited

U.S. PATENT DOCUMENTS

| 3,950,829 A | * | 4/1976 | Cohen ..................... D06F 55/02 |
| | | | 211/124 |
| 4,716,634 A | * | 1/1988 | Fan ......................... D06F 55/00 |
| | | | 223/91 |

(Continued)

*Primary Examiner* — Kyle A Cook
(74) *Attorney, Agent, or Firm* — Jose Cherson Weissbrot

(57) ABSTRACT

The present invention relates to a fastener for use in securing at least a pair of items to one another. The fastener comprises an inner fastener portion comprising a first and a second inner fastener body portion. Each inner fastener body portion has a first end and an opposed second free end. The first and second inner fastener body portions are adjoined by a living hinge at first ends thereof. Inner surfaces of the first and second inner fastener body portion define a first recess for receiving a portion of an item therebetween. The fastener comprises an outer fastener portion comprising a first and a second outer fastener body portion. Each outer fastener body portion has a first end and an opposed second free end. The first and second outer fastener body portions are adjoined at first ends thereof such that inner surfaces of the outer fastener portion define a second recess for receiving the inner fastener portion therebetween. An outer surface of the inner fastener portion comprises at least one first attachment feature for releasable engagement with a corresponding second attachment feature provided by the outer fastener portion to retain the inner fastener portion within the second recess of the second fastener portion. An outer surface of the outer fastener portion comprises at least one connector configured for releasable engagement with at least one corresponding connectors provided by an outer surface of an outer fastener portion of a further fastener.

12 Claims, 6 Drawing Sheets

(56) References Cited

U.S. PATENT DOCUMENTS

| | | | | |
|---|---|---|---|---|
| 5,944,236 A | * | 8/1999 | Cinque | D06F 95/008 24/537 |
| 6,032,294 A | * | 3/2000 | Dean | A41B 11/002 2/239 |
| 6,092,241 A | | 7/2000 | Bellet | |
| 6,185,751 B1 | * | 2/2001 | Mason | D06F 95/008 2/239 |
| 2002/0073519 A1 | * | 6/2002 | Simon | D06F 95/008 24/545 |
| 2007/0256280 A1 | | 11/2007 | Azan | |

* cited by examiner

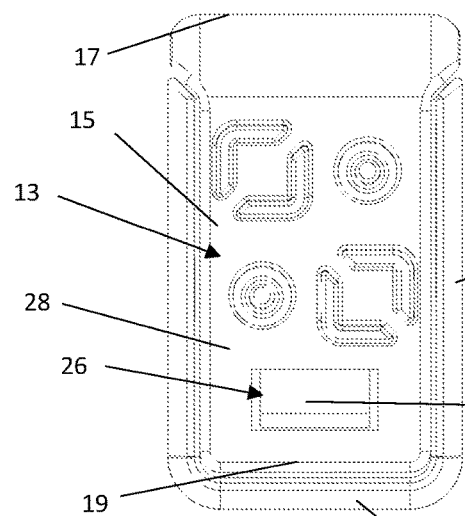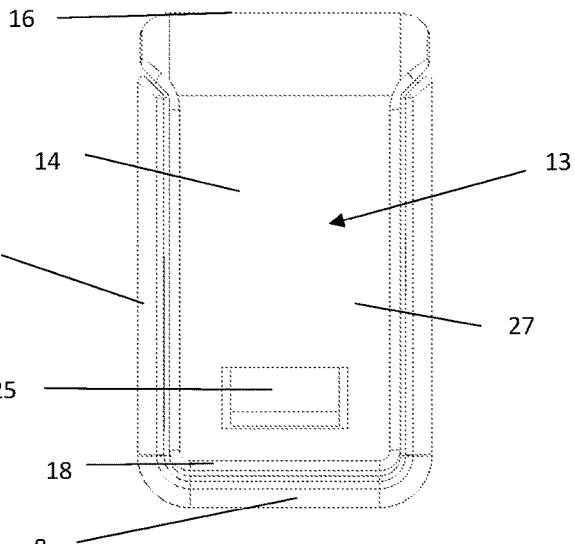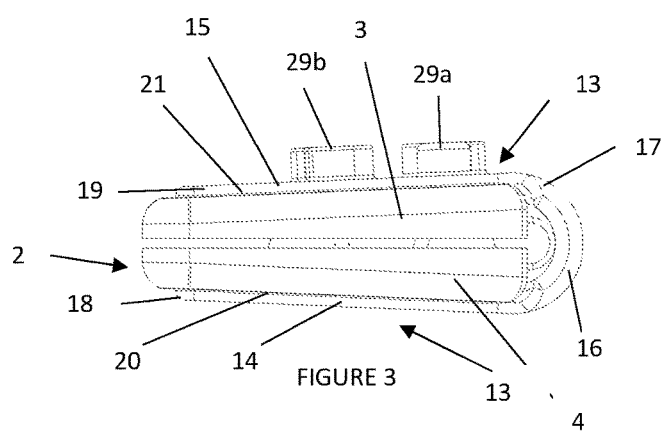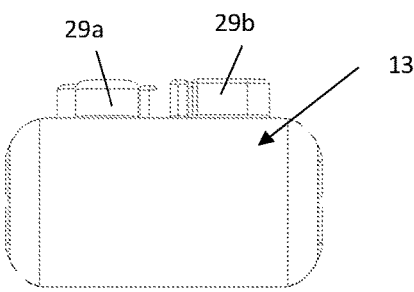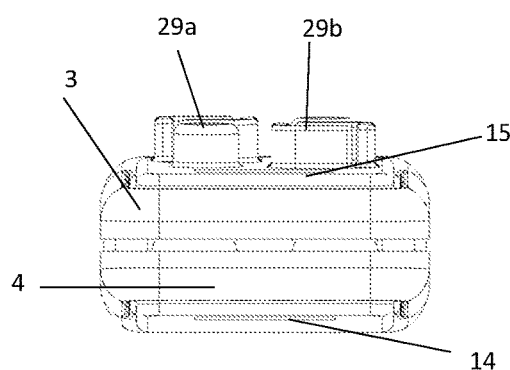
FIGURE 1
FIGURE 2
FIGURE 3
FIGURE 4
FIGURE 5

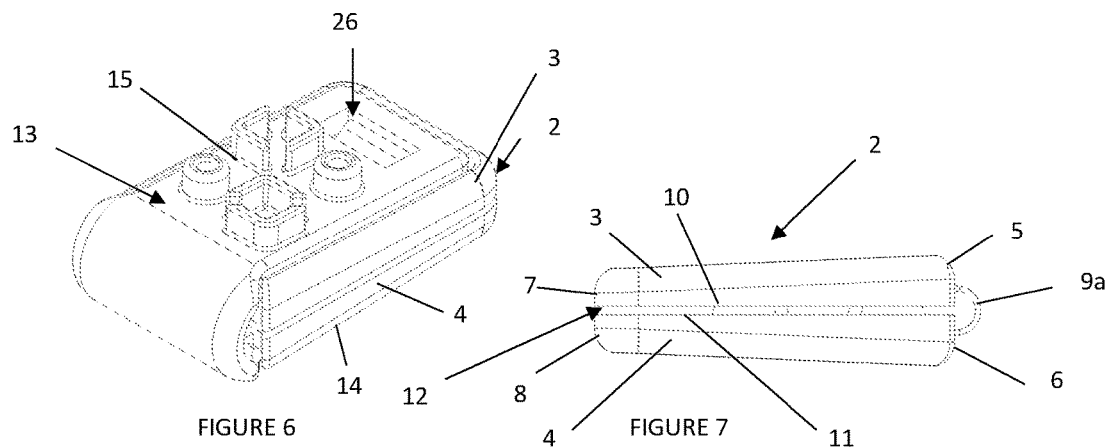
FIGURE 6
FIGURE 7
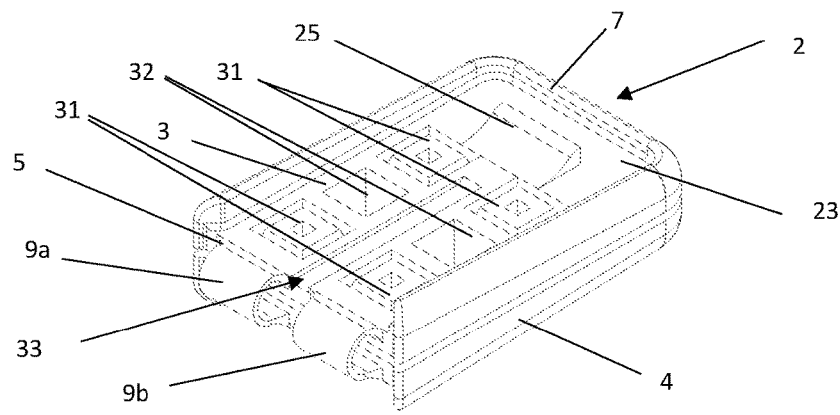
FIGURE 8
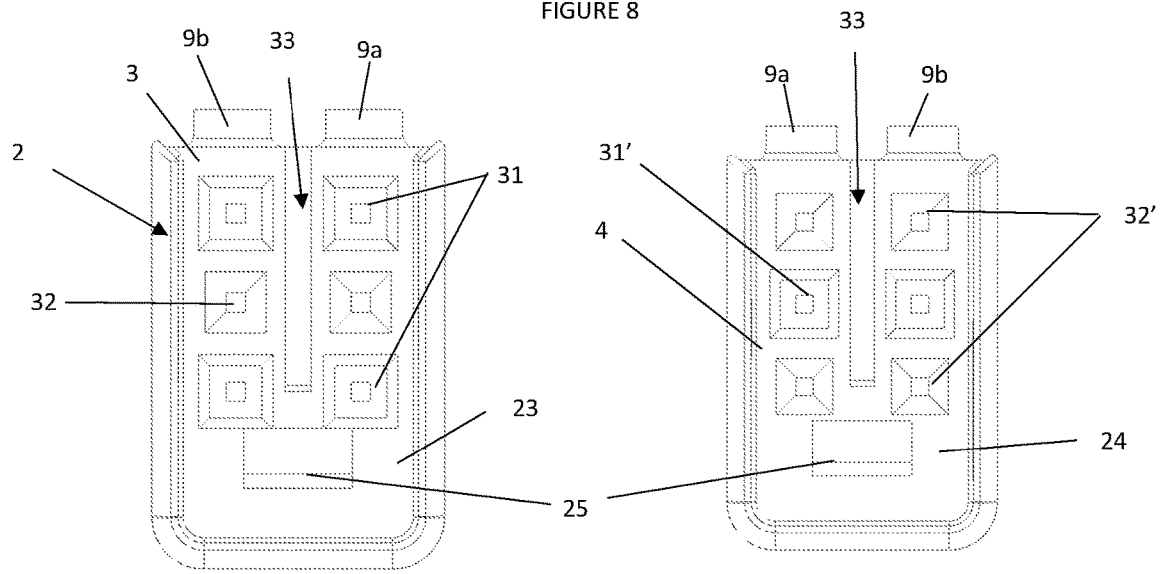
FIGURE 9
FIGURE 10

FASTENER

The present invention relates to a fastener, and in particular to a fastener for releasably securing at least a pair of items together.

BACKGROUND OF INVENTION

It is commonplace for paired items of clothing (for example, socks and gloves) to become separated from each other once worn. It can be time consuming and frustrating for a consumer to have to search through recently washed articles of clothing in order to be able to identify and locate the matching pairs of clothing items. This problem can become even greater when the household contains multiple occupiers. A number of devices exist in order to attempt to address this problem, including:

US-2016/0376745 discloses a laundry snare for laundering a plurality of items. The laundry snare comprises: two elongated cord strands having a first end wherein the two cord strands are connected together; and a second end wherein the two cord strands are connected together. The snare comprises a plurality of loading regions located between the first and second ends formed by a plurality of stoppers positioned along a length of the two cord strands and securing the two cord strands together. The snare further comprises a plurality of releasable cordlock fasteners placed between two of the plurality of stoppers and configured to be selectively located and secured between the two plurality of stoppers.

Known prior art devices are cumbersome and require the user to locate an additional piece of apparatus to connect to the clothing items after they have been worn and prior to putting the clothing items into the wash. Furthermore, the prior art devices are large in size and may interfere with other articles of clothing during the washing process.

It is an object of the present invention to provide a fastener which can be secured to items to enable quick and easy releasable engagement between items so that matching pairs of items can be stored together easily and effectively. It is an object of the present invention to provide a fastener which can be positioned discretely on an item (for example on an item of clothing) while the item is being used (or worn) by the user without interfering with the operation of the item, whilst also enabling quick and easy releasable engagement to an additional fastener located on a further item when the user wishes to store or for example wash the items together.

SUMMARY OF INVENTION

According to a first aspect of the present invention, there is provided a fastener for use in securing at least a pair of items to one another, the fastener comprising:

an inner fastener portion comprising a first and a second inner fastener body portion, each inner fastener body portion having a first end and an opposed second free end, and in which the first and second inner fastener body portions are adjoined by a living hinge at first ends thereof, in which inner surfaces of the first and second inner fastener body portion define a first recess for receiving a portion of an item therebetween; and an outer fastener portion comprising a first and a second outer fastener body portion, each outer fastener body portion having a first end and an opposed second free end, in which the first and second outer fastener body portions are adjoined at first ends thereof such that inner surfaces of the outer fastener portion define a second recess for receiving the inner fastener portion therebetween, in which an outer surface of the inner fastener portion comprises at least one first attachment feature for releasable engagement with a corresponding second attachment feature provided by the outer fastener portion to retain the inner fastener portion within the second recess of the second fastener portion; and in which an outer surface of the outer fastener portion comprises at least one connector configured for releasable engagement with at least one corresponding connectors provided by an outer surface of an outer fastener portion of a further fastener.

In one embodiment, the inner fastener portion and outer fastener portion are configured for slideable engagement within each other. For example, the outer surface of the inner fastener portion (for example the outer surface of each inner fastener body portion) may define a channel shaped and dimensioned to receive a corresponding outer fastener body portion therein.

The outer surface of the inner fastener portion, for example the outer surface of at least one of the first and/or second inner fastener body portion, may for example comprise at least one first guide feature for cooperative engagement with at least one second guide feature provided by an inner surface of the outer fastener portion.

The guide feature(s) may be located at an suitable position on the inner fastener portion and outer fastener portion. In one embodiment, for example, the guide feature(s) are substantially centrally located between the corresponding side portions of the inner fastener portion and outer fastener portion.

The first and second guide features may for example be selected from cooperative channel and ridges. In one embodiment, the outer surface of the inner fastener portion, for example the first and/or second fastener body portion, may provide a groove or channel. The inner surface of the outer fastener portion may provide a protrusion (for example a tab) shaped and dimensioned to be received within, and for example to slideably engage, the groove or channel of the inner fastener portion.

In one embodiment, the outer surface of the inner fastener portion (for example the outer surface of each inner fastener body portion) may define a channel shaped and dimensioned to receive a corresponding outer fastener body portion therein. The channel may further comprise a guide feature, to engage with a corresponding guide feature on an outer surface of a corresponding outer fastener body portion, to aid alignment of the inner fastener portion and outer fastener portion during sliding engagement.

The first attachment feature may for example comprise a protrusion or tab, for example a resilient protrusion or tab, shaped and dimensioned to releasably engage the second attachment feature in the form of for example a recess provided by the inner surface or opening extending between the inner and outer surfaces of the outer fastener portion. The protrusion or tab may extend at an angle to the plane defined by the outer surface of the inner fastener portion and/or the opening may extend at an angle to the place defined by the inner surface of the outer fastener portion to increase the engagement between the inner and outer fastener portions and prevent unintended separation thereof.

The first and second attachment features are preferably located at or adjacent the second free ends of the corresponding inner fastener body portion or outer fastener body portion.

Engagement of the first attachment feature of the inner fastener portion to the second attachment feature of the outer fastener portion is configured to provide pressure, for example downward pressure, onto the inner fastener portion to bring the first and second inner fastener body portions towards each other and to retain them in this closed position.

In one embodiment, the outer surface of each inner fastener body portion comprises at least one first attachment feature for releasable engagement with a corresponding second attachment feature provided by the corresponding outer fastener body portion, In one embodiment, the inner surface of at least one of the first and/or second inner fastener body portion comprises at least one gripping member for gripping the portion of an item located within the first recess.

The gripping member(s) are preferably configured for frictional engagement with the portion of an item located within the first recess. The gripping member(s) is preferably configured to grip without piercing or extending through the portion of the item located within the first recess.

In one embodiment, the gripping member(s) is a protrusion. The inner surface of the first inner fastener body portion preferably comprises at least one protrusion or recess aligned with a corresponding recess or protrusion provided by the inner surface of the second inner fastener body portion.

The protrusions preferably comprise a truncated free end providing sufficient surface area to prevent the protrusion from extending through a weave of the portion of an item received within the first recess.

In one embodiment, the outer surface of the first outer fastener body portion is free of connectors, and the outer surface of the second outer fastener body portion comprises at least one connector.

The outer surface of the outer fastener portion preferably comprises a plurality of connectors.

In one embodiment, the plurality of connectors preferably comprise at least one male connector and at least one female connector.

Each of the first and second outer fastener body portion preferably comprises a first end, a second opposed end, and first and second side portions spaced apart from each other and extending between the first and second ends thereof. Preferably, at least one male connector and at least one female connector are located at or adjacent each side portion on the outer surface of an outer fastener body portion.

In one embodiment, at least one male connector and at least one female connector are located at or adjacent each end on the outer surface of an outer fastener body portion.

For example, the connectors may be provided in a configuration of four connectors, comprising two male connectors and two female connectors. In one embodiment, a first male connector and a first female connector are located adjacent the first side portion, and a second male connector and second female connector are located adjacent the second side portion. The four connectors may be provided in a square or rectangular configuration.

In one embodiment, the plurality of connectors are provided in a configuration on an outer surface of an outer fastener body portion, in which the configuration has a 2-fold rotational symmetry.

By providing a plurality of connectors, comprising a plurality of male and female connectors, for example an equal number of male and female connectors, the fastener can provide improved engagement, and more secure attachment, with a further fastener. As such, the fastener of the present invention can reliably secure a plurality of items together.

Providing a fastener with a plurality of connectors in a configuration having a 2-fold rotational symmetry enables the fastener to be engaged in multiple orientations to a further fastener providing increased versatility.

The connector(s) may be located towards the first end of the outer fastener body portion.

In one embodiment, the connectors are configured for push fit engagement. It is however to be understood that the connectors may for example comprise other components for releasable engagement such as for example magnets.

Once assembled, the at least one living hinge(s) of the inner fastener portion presses against the outer fastener portion (i.e. at the first end of the fastener portion). This pressure creates a downward pressure urging the first and second inner fastener body portions towards each other thereby increasing the frictional engagement with the portion of the item retained in the recess.

The inner fastener portion is preferably moveable between a first closed position in which the inner surfaces of the inner fastener portions are facing and spaced apart from each other to define the first recess such that the second ends of the inner fastener portions are adjacent each other, and a second open position in which the second ends of the inner fastener portions are moved apart from each other.

The inner fastener portion preferably tapers inwardly in a direction extending from the first end towards the second end thereof.

Each of the first and second inner fastener body portions preferably taper inwardly in a direction extending from the first end towards the second end thereof.

The outer fastener portion preferably tapers inwardly in a direction extending from the first end towards the second end thereof.

By providing a fastener in which the outer fastener portion, and optionally inner fastener portion, are tapered inwardly from the first end towards the second end thereof, the fastener may be disengaged from a further fastener by applying pressure at the second free ends of the outer fastener portion, ie. by applying pressure to move the second free ends of the outer fastener portions towards each other. Movement of the second free ends of the outer fastener portions towards each other causes the first ends of the fastener portions to move apart from each other causing disengagement of the connector(s). As such, the fastener of the present invention may be disengaged efficiently and effectively using a single hand of a user.

According to a second aspect, the present invention provides a fastener system comprising a pair of fasteners as herein described, in which the at least one connector of a first fastener are releasably engaged or releasably engageable to the at least one connector of a second fastener.

According to a third aspect, the present invention provides a method of securing a fastener as herein described to a portion of an item, comprising:
  inserting a portion of an item into the first recess defined by the inner fastener portion;
  inserting the inner fastener portion into the second recess of the outer fastener portion;
  releasably engaging the first attachment feature of the inner fastener portion with the second attachment feature of the outer fastener portion.

According to a fourth aspect, the present invention provides a method of pairing a first and second item together using a fastener system as herein described, comprising:

securing a first fastener to a first item and a second fastener to a second item using the method of securing a fastener as herein described; and releasably engaging the at least one connector of the first fastener with the at least one connector of the second fastener.

The above and other characteristics, features and advantages of the present invention will become apparent from the following detailed description, taken in conjunction with the accompanying drawings, which illustrate, by way of example, the principles of the invention. This description is given for sake of example only, without limiting the scope of the invention. The reference figures quoted below refer to the attached drawings.

BRIEF DESCRIPTION OF DRAWINGS

FIG. 1 is a schematic illustration of a view from above of the second outer fastener body portion and inner body portion of a fastener according to one embodiment of the present invention;

FIG. 2 is a schematic illustration of a view from below of the first outer fastener body portion of the fastener of FIG. 1;

FIG. 3 is a schematic illustration of a side view of the fastener of FIG. 1;

FIG. 4 is a schematic illustration of a view from the first end of the fastener of FIG. 1;

FIG. 5 is a schematic illustration of a view from the second end of the fastener of FIG. 1;

FIG. 6 is a schematic illustration of a perspective view from above of the fastener of FIG. 1;

FIG. 7 is a schematic illustration of a side view of the inner fastener portion of the fastener of FIG. 1;

FIG. 8 is a schematic illustration of a perspective view from above of the inner fastener portion of the fastener of FIG. 1 in the closed position;

FIG. 9 is a schematic illustration of a view from above of the first inner fastener body portion of the fastener of FIG. 1;

FIG. 10 is a schematic illustration of a view from above of the second inner fastener body portion of the fastener of FIG. 1;

DETAILED DESCRIPTION

Figure 11:
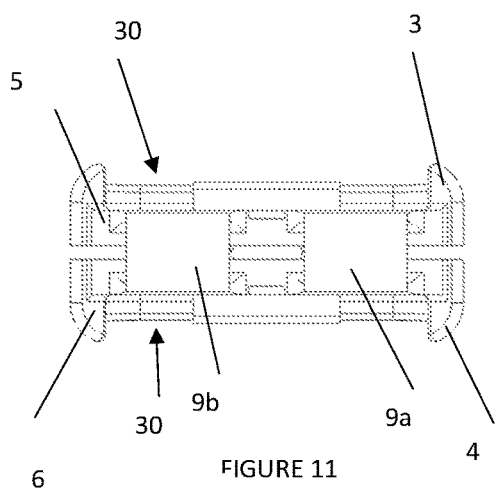
FIG. 11 is a schematic illustration of a view from the first end of the inner fastener portion of the fastener of FIG. 1 in the closed position.

With reference to the Figures, a fastener 1 comprises an inner fastener portion 2 comprising a first 3 and a second 4 inner fastener body portion. Each inner fastener body portion 3, 4 has a first end 5, 6 and an opposed second free end 7, 8. The first and second inner fastener body portions 3, 4 are adjoined by a pair of spaced apart living hinges 9a,b at first ends 5, 6. Although the illustrated embodiment shows an inner fastener portion 2 comprising a pair of spaced apart living hinges 9a,b to join together the first and second inner fastener body portions 3, 4, it is to be understood that the inner fastener portion 2 may comprise a single living hinge, or a plurality (for example more than two) of spaced apart living hinges.

The inner surfaces 10, 11 of the first and second inner fastener body portions 3, 4 define a first recess 12 for receiving a portion of an item (not shown) therebetween.

The fastener may be used to secure any suitable items to each other. For example, the fastener may be a clothing fastener for securing articles of clothing, or different sections of a single item of clothing, together when worn and/or after being worn (for example while being cleaned and/or stored). The fastener may be a laundry fastener for securing articles of clothing, or different sections of a single item of clothing, together during the process of being cleaned and stored. In particular, the fastener may be used to secure pairs of items such as for example gloves or socks together. The fastener may therefore be a sock or glove pairing fastener, for example a sock fastener. It is however to be understood that the fastener is not to be limited to being used for securing clothing items together.

The fastener of the present invention may be used to secure together a pair of items. It is however to be understood that the fastener may be used to secure together more than two items. The items may all be the same. Alternatively, the fastener may be used to secure together a plurality of different items.

The fastener 1 further comprises an outer fastener portion 13 comprising a first 14 and a second 15 outer fastener body portions. Each outer fastener body portion 14, 15 has a first end 16, 17 and an opposed second free end 18, 19. The first and second outer fastener body portions 14, 15 are adjoined at first ends 16, 17 thereof such that inner surfaces 20, 21 of the outer fastener portion define a second recess 22 for receiving the inner fastener portion 2 therebetween.

The outer fastener portion 13 is substantially C-shaped in cross section.

The outer surface 23, 24 of each inner fastener portion 3, 4 comprises a first attachment feature in the form of a resilient tab 25 located adjacent the second end 7, 8 and extending outwardly from the outer surface 23, 24 thereof.

Each outer fastener body portion 14, 15 provides an opening 26, located adjacent the second end 18, 18 thereof and extending between the corresponding inner surfaces 20, 21 and outer surfaces 27, 28 thereof.

The outer surface 27 of the first outer fastener body portion 14 is free of connectors. The outer surface 28 of the second outer fastener body portion 15 comprises four spaced apart connectors 29 in a 2×2 square configuration. The connectors 29 are located adjacent the first end 17 of the second outer fastener body portion 15.

It is to be understood that although the illustrated embodiment shows a first outer fastener body portion which does not comprise connectors, it is to be understood that in some embodiments the first outer fastener body portion may comprise connectors, and for example each of the first and second outer fastener body portions may comprise connectors.

It is also to be understood that the connectors may be provided at any suitable location on the outer fastener body portions and are not limited to being located at or adjacent the second ends thereof.

The four connectors 29 comprise two male connectors 29a, 29a' and two female connectors 29b, 29b'. The male connectors 29a, 29a' are shaped and dimensioned to engage, preferably releasably engage, the female connectors 29b, 29b' provided on a further fastener 1'.

The connectors 29 are provided in a square configuration with a 2 fold rotational symmetry. It is to be understood that the outer fastener body portions may each comprise any suitable number of connectors in any suitable configuration.

The inner fastener portion 2 and outer fastener portion 13 are configured for slideable engagement within each other. It can be seen that the outer surfaces 23, 24 of the inner fastener body portions 3, 4 each define a channel 30 shaped and dimensioned to receive a corresponding outer fastener body portion 14, 15 therein.

The inner surfaces 10, 11 of each of the first and second inner fastener body portion 3, 4 comprises a plurality of gripping members 31, 31' for gripping the portion of an item located within the first recess 12. The gripping members 31, 31' are configured for frictional engagement with the portion of an item located within the first recess. 12 The gripping members are configured to grip without piercing or extending through the portion of the item located within the first recess 12.

The gripping members 31, 31' are truncated square based pyramid protrusions. It is however to be understood that the gripping members 31, 31' may have any suitable form and/or shape provided the protrusion has sufficient surface area to prevent the protrusion from extending through a weave of the portion of an item received within the first recess 12.

A first inner fastener body portion 3 provides four gripping members 31 arranged in two parallel row (each row comprising two gripping members 31) extending between the first and second ends 5, 7 thereof. Each row of gripping members 31 comprises a pair of gripping members 31 spaced apart by a correspondingly shaped recess 32. A gripping member 31 in a first row is located next to a gripping member 31 in a second row.

The second inner fastener body portion 4 provides a complementary arrangement of gripping members 31' and recesses 32'. In particular, the second inner fastener body portion 4 comprises four recesses 32' arranged in two parallel rows (each row comprising two recesses 32') extending between the first and second ends 5, 7 thereof. Each row of gripping members 31' comprises a pair of recesses 32' spaced apart by a correspondingly shaped gripping member 31'. A gripping member 31' in a first row is located next to a gripping member 31' in a second row.

It is to be understood that the first and second inner fastener body portions may comprise any suitable number of gripping members and recesses, in any suitable configuration, depending on the requirements for the fastener.

The location of the gripping members 31 of the first inner fastener body portion 3 are such that in use the or each gripping member is configured in use to be received within at least a portion of a corresponding recess 32 provided by the second inner fastener body portion when the inner fastener portion 2 is in a closed configuration.

The outer surface 23, 24 of each inner fastener body portion 3, 4 comprises a guide channel 33 extending from the second end 7, 8 towards the first end 5, 6 thereof. The guide channel 33 has an open end at the second end 7,8 of the inner fastener body portion 3, 4. In the illustrated embodiment, each inner body fastener portion 3,4 has a substantially centrally located (i.e. substantially centrally located between opposed side portions of the inner fastener body portion) guide channel 33. It is however to be understood that each fastener body portion 3,4 may comprise any suitable number of guide features, in the form of for example a channel or a ridge, in any suitable location on the outer surface 23, 24 thereof.

The inner surfaces 20, 21 of the outer fastener body portions 14, 15 each further comprise a substantially centrally located guide ridge 34 configured in use to be received within a corresponding guide channel 33 of an inner fastener body portion 3, 4. In the illustrated embodiment, each outer fastener body portion 14, 15 has a substantially centrally located (i.e. substantially centrally located between opposed side portions of the outer fastener body portion) guide ridge 34. It is however to be understood that each fastener body portion 14, 15 may comprise any suitable number of guide features, in the form of for example a channel or a ridge, in any suitable location on the inner surface 20, 21 thereof.

Figure 12:
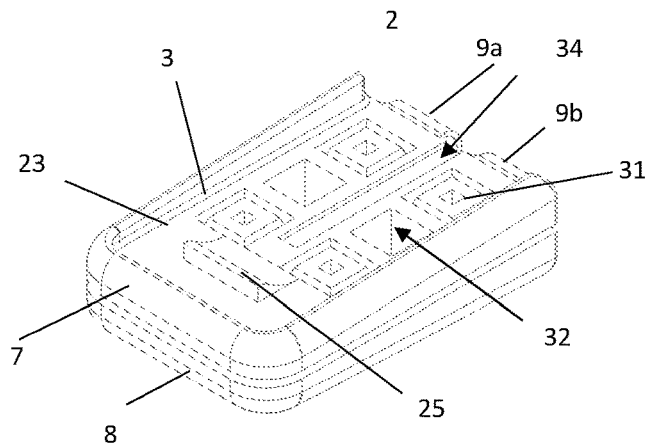
FIG. 12 is a schematic illustration of a view from above of the inner fastener portion of the fastener of FIG. 1 in the closed position.
Figure 13:
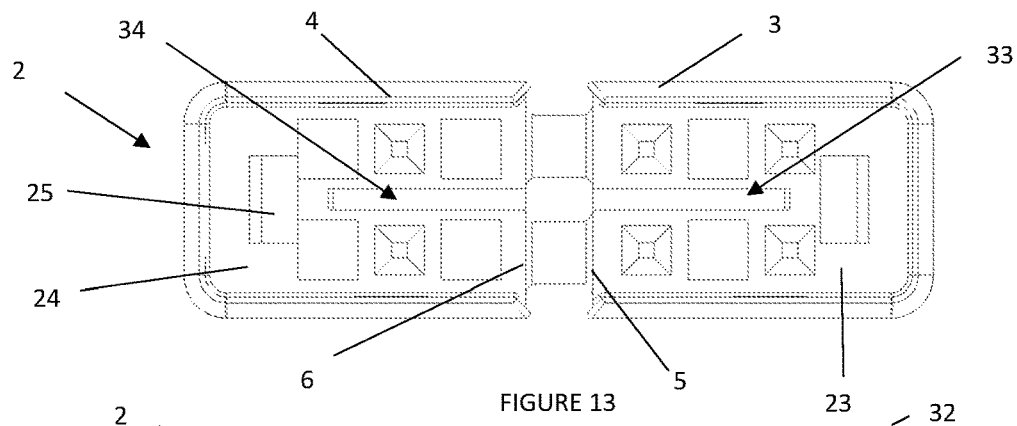
FIG. 13 is a schematic illustration of a view from above of the inner surfaces of inner fastener portion of the fastener of FIG. 1 in the open position.
Figure 14:
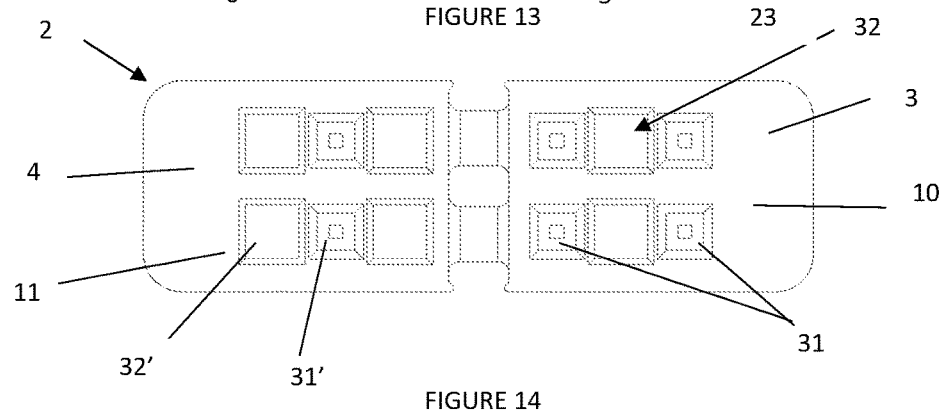
FIG. 14 is a schematic illustration of a view from above of the outer surfaces of the inner fastener portion of the fastener of FIG. 1 in the open position.
Figure 15:
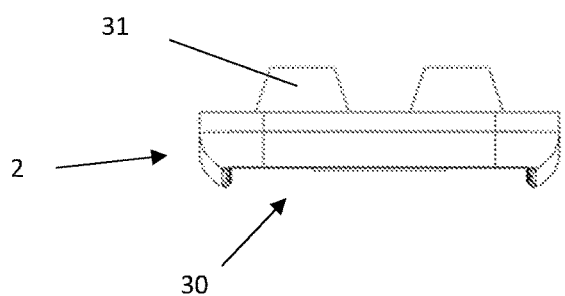
FIG. 15 is a schematic illustration of a view from a second end of a first inner fastener body portion of the fastener of FIG. 1 in the open position.
Figure 16:
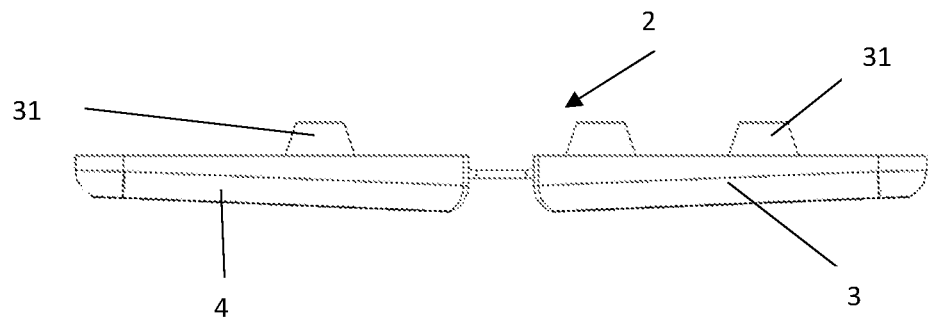
FIG. 16 is a schematic illustration of a side view of the inner fastener portion of the fastener of FIG. 1 in the open position.
Figure 17:
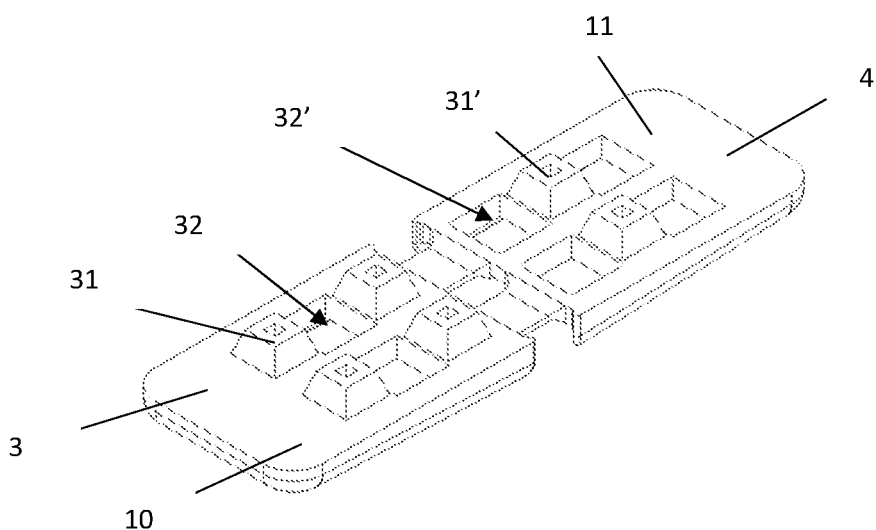
FIG. 17 is a schematic illustration of a perspective view from above of the inner fastener portion of the fastener of FIG. 1 in the open position.
Figure 18:
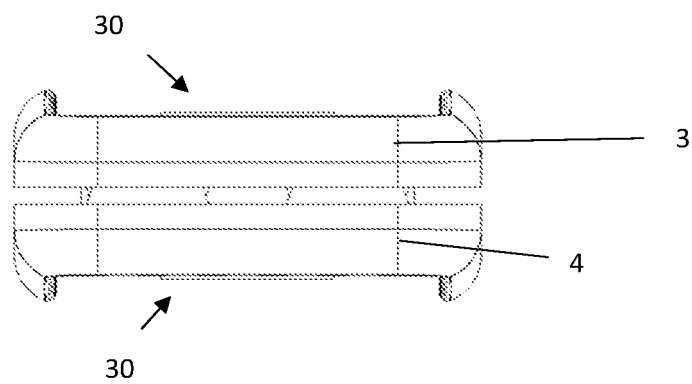
FIG. 18 is a schematic illustration of a view from the second ends of the inner fastener portion of the fastener of FIG. 1 in the closed position.
Figures 19, 20:
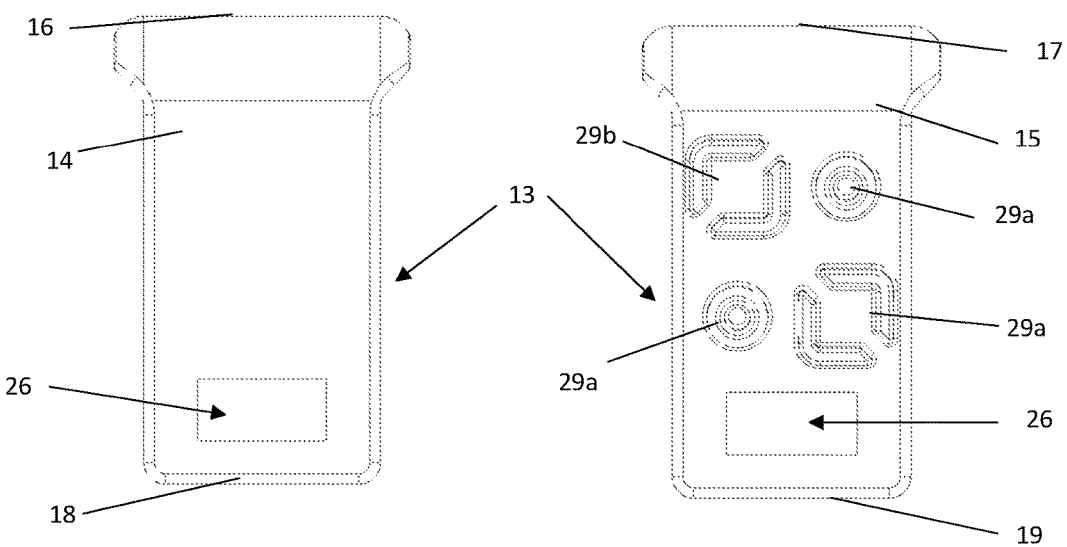
FIG. 19 is a schematic illustration of a view from above of the outer surface of the first outer fastener body portion of the fastener of FIG. 1.
FIG. 20 is a schematic illustration of a view from above of the outer surface of the second outer fastener body portion of the fastener of FIG. 1.
Figure 21:
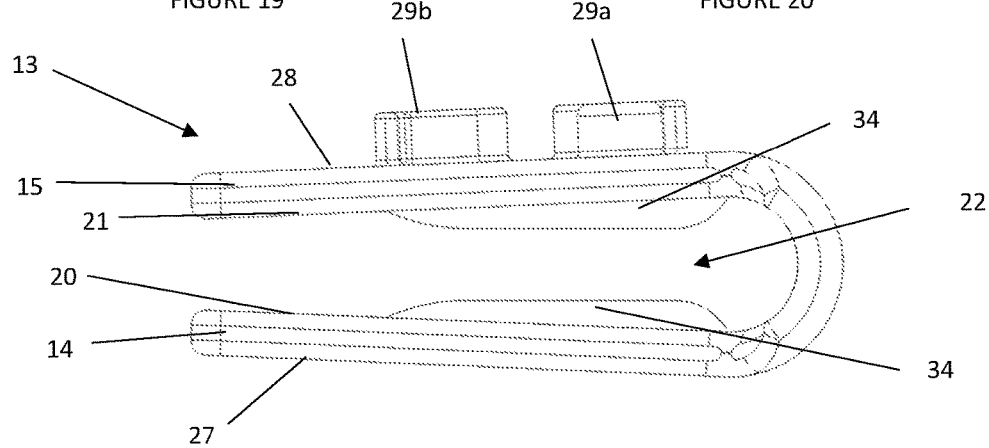
FIG. 21 is a schematic illustration of a side view of the outer fastener body portion of the fastener of FIG. 1.
Figures 22, 23:
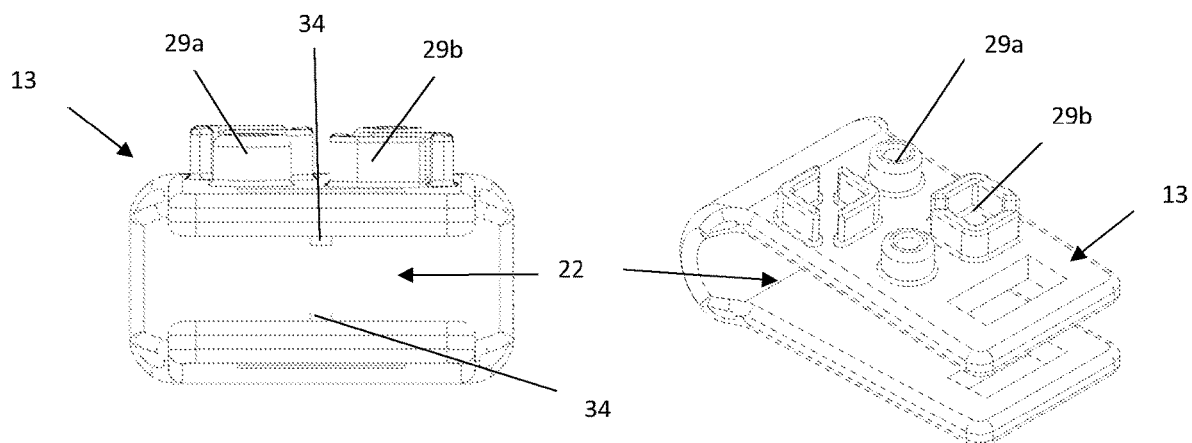
FIG. 22 is a schematic illustration of a view from the second free ends of the outer fastener body portion of the fastener of FIG. 1.
FIG. 23 is a schematic illustration of a perspective view from above of the outer fastener body portion of the fastener of FIG. 1.
Figure 24:
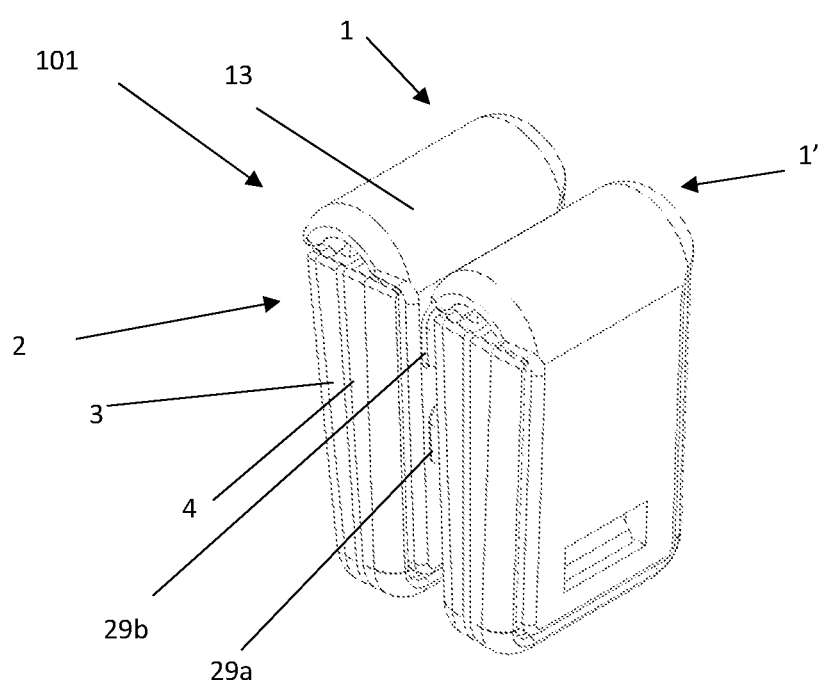
FIG. 24 is a schematic illustration of a fastener system comprising a pair of fasteners according to the embodiment of FIG. 1.

In use, the inner fastener portion 2 is moveable between a first closed position (FIGS. 7 to 12) in which the inner surfaces 10, 11 of the inner fastener body portions 3, 4 are facing and spaced apart from each other to define the first recess 12 such that the second ends 7, 8 of the inner fastener body portions 3, 4 are adjacent each other, and a second open position (FIGS. 13 to 17) in which the second ends 7, 8 of the inner fastener body portions 3, 4 are moved apart from each other.

A user may place the inner fastener portion 2 in the second open position (FIGS. 13 to 17). A portion of an item, for example an item of clothing, such as a sock or glove, may be placed adjacent the inner surface 10, 11 of a first or second inner fastener body portion 3, 4 such that the portion of the item is position adjacent the corresponding gripping members 31, 31'.

The user may the move the inner fastener portion 2 to the first closed position (FIGS. 7 to 12) to define a first cavity 12 within which the portion of the item is retained. The gripping members 31, 31' of the inner fastener body portion 3, 4 frictionally engage the portion of the item and are received within corresponding recesses 32, 32' of the corresponding inner fastener body portion 4, 3. It is to be understood that the gripping members 31, 31' are shaped such that the members 31, 31' do not extend through the weave of the portion of the item and as such do not create any damage, such as holes or wear and tear to the portion of the item during use.

The user slideably engages the inner fastener portion 2 within the second recess 22 defined by the outer fastener portion 13. The first and second outer fastener body portions 14, 15 slidingly engage the channel 30 defined by the outer surfaces 23, 24 of the inner fastener body portions 3, 4. The guide channels 33 of the inner fastener body portions 3, 4 receive the guide ridges 34 of the outer fastener body portions 14, 15 to ensure alignment of the inner and outer fastener body portions 3, 4, 14, 15 relative to each other. The inner fastener portion 2 is inserted into the second recess 22 until the resilient tabs 25 are each received within and extends through the corresponding openings 26 provided by the outer fastener body portions 14, 15. Engagement of the tabs 25 within openings 26 urges the living hinge 9a, b to press against the first ends 16, 17 of the outer fastener portion 13 creating a downward pressure urging the first and second inner fastener body portions 3,4 towards each other thereby increasing the frictional engagement with the portion of the item.

The user can then connect a further identical fastener to another item.

The user then aligns the connectors 29 of a first fastener within the connectors of a second fastener such that each male connector 29a engages a corresponding female connector 29b. The connectors are preferably configured for releasable push fit engagement.

The fastener of the present invention provides for efficient and secure attachment to items, for example items of clothing without causing any damage to the items itself. Furthermore, the fastener of the present invention provides for quick and easy installation and secure and reliable engagement between fasteners ensuring that the items do not become separated unintentionally.

To separate the fasteners, the user simply disengaging the connectors of the first fastener from the connectors of the second fastener. This may be achieved by for example moving the second ends 18 of the outer fastener portions 13 of the fasteners 1 towards each other causing the connectors 29 located adjacent the second end of the outer fastener portion to become separated.

The above and other characteristics, features and advantages of the present invention will become apparent from the following detailed description, taken in conjunction with the accompanying drawings, which illustrate, by way of example, the principles of the invention. This description is given for sake of example only, without limiting the scope of the invention.

Although the illustrated embodiments describe the use of the fastener for securing together items of clothing it is to be understood that the fastener may be used to secure together any suitable items and is not to be limited to clothing.

The present invention has been described with respect to the drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

The terms first, second and the like in the description and in the claims are used for distinguishing between similar elements and not necessarily for describing a sequence. It is to be understood that the terms so used are interchangeable under appropriate circumstances.

Reference throughout the specification to "an embodiment" or "an aspect" means that a particular feature, structure or characteristic described in connection with the embodiment or aspect is included in at least one embodiment or aspect of the invention. The particular features, structures or characteristics of any embodiment or aspect of the invention may be combined in any suitable manner, as would be apparent to one of ordinary skill in the art from this disclosures, in one or more embodiments or aspects.

It is also to be appreciated that while some embodiments described herein include some features included in other embodiments, combinations of features of different embodiments are intended to be within the scope of the invention, and form yet further embodiments, as will be understood by those skilled in the art.

What is claimed:

1. A fastener for securing at least a pair of items to one another, the fastener comprising:

an inner fastener portion comprises a first inner fastener body portion and a second inner fastener body portion, wherein each of the inner fastener body portions having a first end and second free end, the first inner fastener body portion and the second inner fastener body portion are adjoined by a plurality of living hinges provided at the first end of each of the inner fastener body portions, each of the inner fastener body portions have an inner surface, the inner surfaces of each of the inner fastener body portions defines a first recess between the first inner fastener body portion and the second inner fastener body portion, the first recess between the first inner fastener body portion and the second inner fastener body portion receives a portion of an item of the at least a pair of items; and an outer fastener portion comprises a first outer fastener body portion and a second outer fastener body portion, each of the outer fastener body portions having a first end and second free end, the first outer fastener body portion and the second outer fastener body portion are adjoined at the first end of each of the outer fastener body portions, each of the outer fastener body portions have an inner surface, the inner surface of each of the outer fastener body portions defines a second recess between the first outer fastener body portion and the second outer fastener body portion, the second recess between the first outer fastener body portion and the second outer fastener body portion receives the inner fastener portion, wherein an outer surface of the inner fastener portion comprises at least one first attachment feature for a releasable engagement with a corresponding second attachment feature provided by the outer fastener portion to retain the inner fastener portion within the second recess of the outer fastener portion; and an outer surface of the outer fastener portion comprises a plurality of connectors provided in a configuration, and the configuration has a 2-fold rotational symmetry, the plurality of connectors comprise at least one male connector and at least one female connector, each of the connectors being configured for releasable engagement with a corresponding connector of an identical plurality of connectors provided in an identical configuration on an outer surface of an outer fastener portion of a further identical fastener.

2. The fastener as claimed in claim 1, wherein the inner fastener portion and outer fastener portion are configured for slideable engagement with each other.

3. The fastener as claimed in claim 1, wherein the outer surface of at least one of the first and/or second inner fastener body portion comprises at least one first guide feature for cooperative engagement with at least one second guide feature provided by the inner surface of the outer fastener portion.

4. The fastener as claimed in claim 1, wherein the first attachment feature comprises a protrusion, and in which the second attachment feature is a recess provided by the inner surface or opening extending between the inner and outer surfaces of the outer fastener portion.

5. The fastener as claimed in claim 1, wherein the inner surface of at least one of the first and/or second inner fastener body portion comprises at least one gripping member for gripping the portion of the item located within the first recess.

6. The fastener as claimed in claim 1, wherein the first and second attachment features are located at or adjacent the second free ends of the corresponding inner fastener body portion or outer fastener body portion.

7. The fastener as claimed in claim 1, wherein the outer surface of the first outer fastener body portion is free of connectors, and in which the outer surface of the second outer fastener body portion comprises the plurality of connectors.

8. The fastener as claimed in claim 1, wherein each of the first outer fastener body portion and the second outer fastener body portion comprises a first side portion and a second side portion spaced apart from each other and extending between the first end and the second end of each of the outer fastener body portions, and one of the at least one male connector and one of the at least one female connector are located adjacent to each other on one of the first and second side portions on the outer surface of one of the first outer fastener body portion and the second outer fastener body portion.

9. The fastener as claimed in claim 1, wherein the inner fastener portion is moveable between a first closed position in which the inner surfaces of the inner fastener portions are facing and spaced apart from each other to define the first recess such that the second ends of the inner fastener portions are adjacent each other, and a second open position in which the second ends of the inner fastener portions are moved apart from each other.

10. The fastener as claimed in claim 1, wherein the inner fastener portion tapers inwardly in a direction extending from the first end towards the second end thereof.

11. A fastener system, comprising: a pair of fasteners as claimed in claim 1, wherein the at least one male connector and the at least one female connector of a first fastener of the pair of identical fasteners are releasably engaged or releasably engageable to the at least one female connector and at least one male connector of a second identical fastener of the pair of identical fasteners.

12. A method of securing a fastener as claimed in claim 1 to the portion of the item of the at least a pair of items, comprising:
  inserting the portion of the item of the at least a pair of items into the first recess defined by the inner fastener portion;
  inserting the inner fastener portion into the second recess of the outer fastener portion, wherein the outer fastener portion tapers inwardly in a direction extending from the first end towards the second end thereof; and
  releasably engaging the first attachment feature of the inner fastener portion with the second attachment feature of the outer fastener portion.

* * * * *